July 25, 1944.  W. E. LYON  2,354,444
WHEEL CONSTRUCTION
Filed May 21, 1942  2 Sheets-Sheet 1

Inventor
WALTER E. LYON

By Ely & Frye
Attorneys

Patented July 25, 1944

2,354,444

UNITED STATES PATENT OFFICE 2,354,444

WHEEL CONSTRUCTION

Walter E. Lyon, Akron, Ohio, assignor to The Firestone Tire & Rubber Company, Akron, Ohio, a corporation of Ohio Application May 21, 1942, Serial No. 443,893

5 Claims. (Cl. 301—38)

This invention relates to wheel constructions for pneumatic tires and especially it relates to such wheel construction that employs projected restrictor rings removably attached to the flanges of a conventional tire rim whereby the lateral bulge of the sides of a tire when the tire is in service is restricted to a predetermined limit and whereby auxiliary road contact members are provided.

Heretofore there have been wheels whose construction involved outwardly projecting annular supporting flanges arranged in spaced relation to a tire and terminating inwardly of the tread of the tire so as to form a support to replace that of the tire when the tire became deflated. However, so far as applicant has been able to learn, none of these have provided a practical auxiliary running surface for a tire and wheel assembly in the event of an over-load or a flat tire, nor have they restricted the side bulge of a tire to a predetermined limit, whereby the sides of the deflated tire are braced between the supporting flanges and thereby the tire carries a substantial part of the load on said assembly even though the tire is deflated.

An object of this invention is to provide a pneumatic tire and wheel assembly wherein a pair of ground contacting tires auxiliary to an ordinary pneumatic tire will be brought into operative service in contact with the ground when the said pneumatic tire becomes underinflated, punctured, overloaded, or receives a severe impact. Obviously such an assembly is very desirable for vehicles used by the military in combat service. In immediate combat service, a tire receives extreme abuse as well as being exposed to gunfire. If a pneumatic tire on an ordinary wheel assembly becomes flat during combat, the driver of a vehicle on which such flat tire occurs, is able to steer the vehicle only with great difficulty and indeed often not at all. The same is true to a less degree when a tire has lost a substantial amount of its inflation pressure.

Another object of the invention is to provide means whereby a driver of a vehicle in combat service may continue to drive the vehicle after it has a flat tire, either to continue in combat or to drive out of the combat area.

A further object of the invention is to provide restrictor members to a wheel assembly that may be placed in operative position in combination with a conventional tire and wheel assembly without the use of bolts or other external attachments.

Still another object of the invention is to provide armor protection for a tire.

A still further object of the invention is to provide a protective channel between two rigid members in combination with a tire rim so constructed that when a flat or abnormally underinflated tire occurs on said rim that the tire will be pressed back into such channel and injury to the tire will be avoided.

Other objects and advantages of the invention will be manifest to those familiar with the art by reference to the drawings wherein.

In this application the word "wheel" includes the tire rim even though the rim be of a demountable type.

Figure 1:
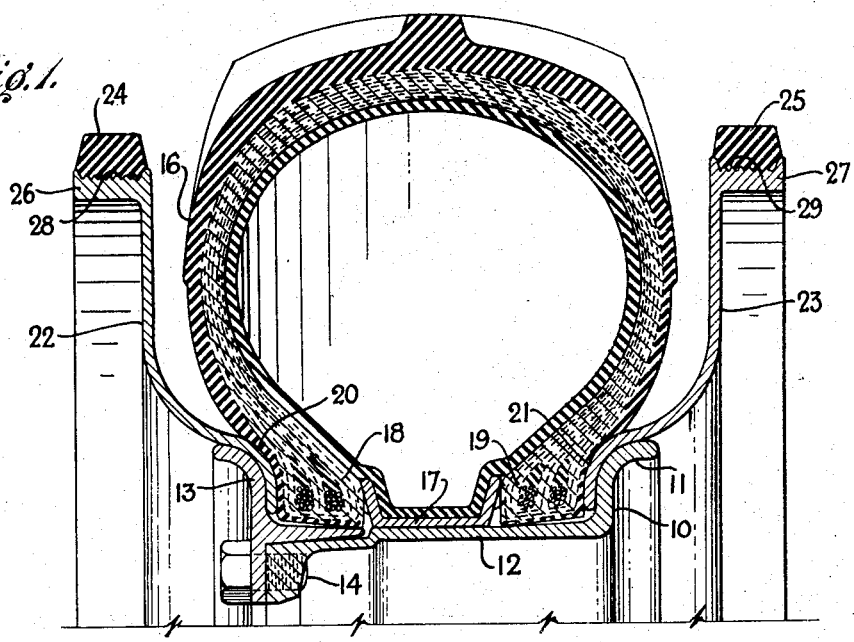
Fig. 1 is a transverse cross-sectional view of a wheel embodying the invention and having a tire applied to the wheel.
Figure 2:
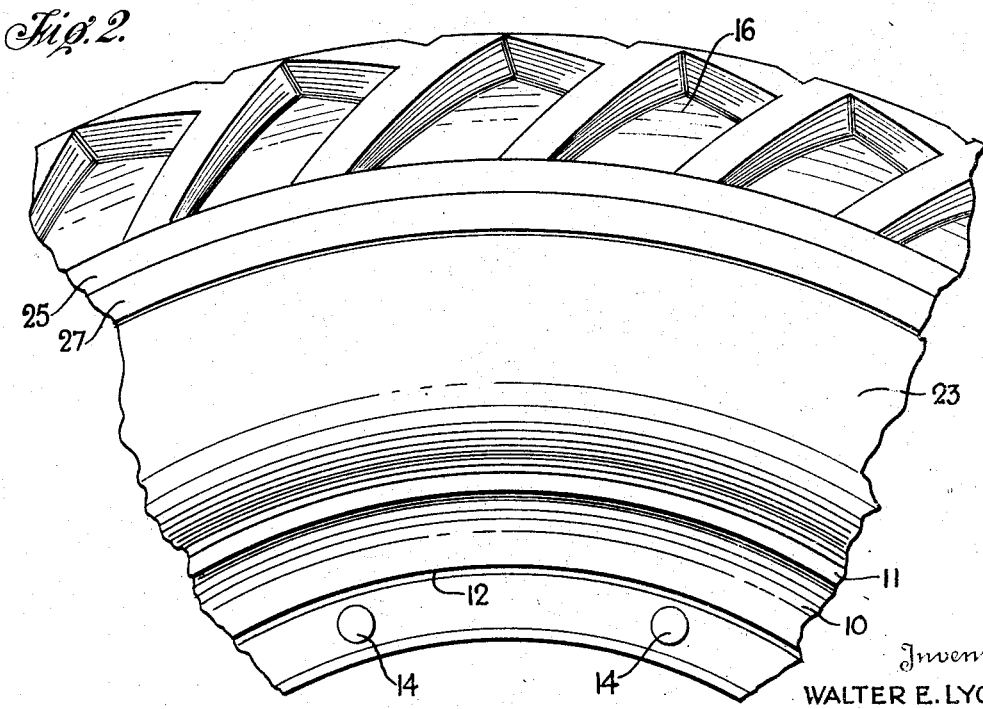
Fig. 2 is a fragmentary side elevational view of the wheel and tire shown in Fig. 1.
Figure 3:
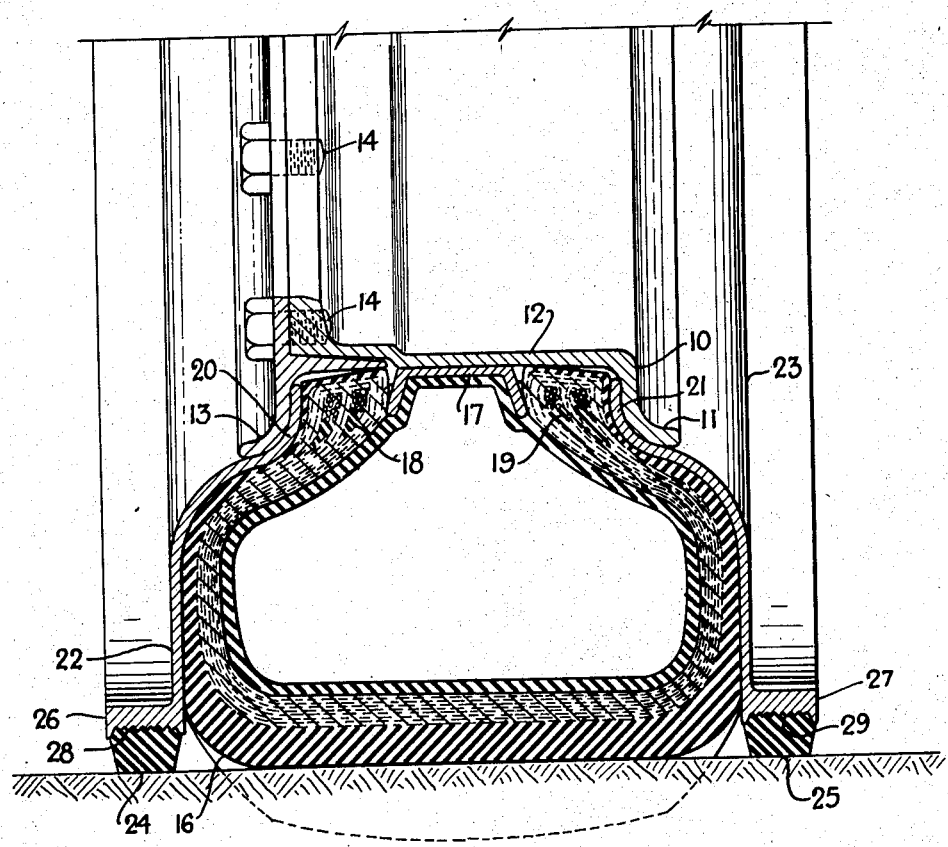
Fig. 3 is the same as Fig. 1 except the component parts of the assembly are shown, somewhat diagrammatically, in the relative position they will occupy at the road contact area when the tire is run flat.

Referring to the drawings in detail there is illustrated a wheel assembly comprising a conventional divided pneumatic straight side tire rim 10, such rim being in common use and referred to by the industry as rims for defense service. The rim 10 has the usual side flange 11 formed integrally with the base 12 of the rim and the removable side flange 13 held in operative position by cap screws 14 all of which will be readily understood by those familiar with the art. A pneumatic tire 16, which may be of any conventional type, is shown mounted on the tire rim with bead locking means 17 mounted between the toes of the beads 18 and 19 of the tire. Positioned between the heels of the beads 18 and 19 and the flanges 11 and 13 are the inner marginal portions 20 and 21 of annular upwardly and outwardly projecting restrictor members 22 and 23 respectively. These restrictor members are composed of thin metal as for example $\tfrac{3}{16}$" thick on a 6.00 C. T. rim mounting. The portions 20 and 21 of the restrictors are formed on their outside faces to follow the flare and to fit against the inside faces of the rim flanges 11 and 13. The inside or confronting faces of these portions are formed to present to the beads of the tire respective surfaces that have the same contour as the bead contact surfaces of the rim flanges 11 and 13. Thus it will be seen that the tire bead fit to the rim 10 is not affected by the installation of the restrictor members 22 and 23 except the width between the flanges 11 and 13 have been reduced by the thickness of said restrictors which in this illustration would be three-eighths of an inch. Since the widths of tire rims between their flanges can ordinarily be narrowed as much as three-eighths of an inch or more without impairing the service a tire mounted on such rim will give, it will be seen that the restrictor members employed in this invention may be used on standard tire rims. It will also be seen by reference to Figs. 1 and 3 that the restrictors overhang and are supported on the flared portions of the flanges 11 and 13. The outside peripheral portion of the restrictors 22 and 23 terminate in secondary or auxiliary tires 24 and 25 respectively. The tires 24 and 25 are cushion tires although it is to be understood that any satisfactory type of cushioning the peripheral ground contacting edges of the restrictors comes within the scope of the present invention. Indeed the restrictors may be formed without the said cushioning and still function to contribute a number of new and important advantages over the prior art.

As shown the outer peripheral portions of the members 22 and 23 are turned outwardly transversely to the plane of the rim 10 at an angle of approximately 90° to form bases 26 and 27 for the tires 24 and 25 respectively. These said bases have corrugated faces 28 and 29 respectively to which the tires 24 and 25 are attached in the usual manner of manufacturing solid rubber tires which will also be understood by those familar with the art. It is to be noted that the restrictor extends in spaced relation a distance along the sides of the tire 16 to a point whose radial distance from the base of the rim 10 is a substantial part of the sectional height of said tire 16. The sides of the restrictors 22 and 23 intermediate the bases 26 and 27 and the inner marginal portions 20 and 21 respectively follow the general outline of the sidewall of the tire except that the portion adjacent to the rim flanges projects outwardly from the tire to establish a spaced relation between the sides of said restrictor and the sides of said tire 16 when the tire is in normal inflated condition and not deflated under load. In practice it has been found that the spacing between the sidewalls of the tire and the restrictor rings must be controlled to within a comparatively narrow range. Likewise it has been found that the relation between the outside diameter of the restrictor rings and the outside diameter of the tire must also be controlled within a narrow range. Thus a spacing of ½" to ¾" between the restrictor members and the sides of an 8.25" tire on a 6.00 C. T. rim gives satisfactory results when the outside diameter of the restrictor rings permits a 25% to 30% deflection of the tire measured as the standng height above the flange of the rim.

The bead locking means 17 is not necessary in the operations of an assembly involving the present invention, but it has been found that such bead lock in combination with the other components of the assembly gives additional stability to the assembly when it is run at a high rate of speed over rough ground when the tire 16 of the assembly is deflated as by a puncture. The bead locking means may be of any type found satisfactory.

In assembling the wheel involving the invention, first the restrictor ring 23 is placed in position on the flange 11 of the rim 10. Next, the tire 16 with a conventional inner tube mounted therein, as shown, and the bead lock 17 in position between the beads 18 and 19 is placed on the rim base 12.

Then the restrictor ring 22 is placed on the removable flange 13 and in assembled relation the restrictor 22 and flange 13 are placed in position on the rim base 12 where the flange 13 is bolted fast by the cap screw 14. As in ordinary tires the inner tube is next inflated and the assembly is ready for service. Of course, the assembly as described above is mounted on or is in part integral with other necessary parts of a wheel as a hub to receive an axle, etc., all of which will be readily understood by those familiar with the art.

In operation the tire is inflated to normal internal air pressure, as for example, 60# for an 8.25 tire. With normal inflation the tire 16 will be sustained against extreme deflection when the tread portion is run at moderate speed in contact with a relatively smooth ground surface, as an improved road in fair condition. Under these conditions the tires 24 and 25 of the restrictor rings 22 and 23 respectively do not contact the ground and accordingly are not in cooperation with the tire 16. However, when the tire 16 becomes abnormally flattened either by underinflation, over-load, a punctured tube or striking an obstruction such as a stone in a field, etc., then the sides of the tire 16 bulge toward and against the sides of the restrictor members 22 and 23 which contact immediately imparts additional support to the tire 16 and sets up additional resistance to the load or force tending to flatten the tire. Since the members or restrictors 22 and 23 are rigid and relatively close to the sides of the tire 16 the distance the sides of the said tire 16 can bulge is definitely limited. The contact of the sides of the tire 16 with the members 22 and 23 at first involves only a small area of contact which progressively increases as the tire is flattened until the road contact portion of the tread has been pressed inwardly between the restrictor members to a point which will expose the tread of the secondary or auxiliary tires 24 and 25 to the ground surface. It has been found that in operation a tire of conventional design mounted on a rim using restrictor rings as described hereinabove will support as much as 69% of the load carried by the wheel on which it is mounted even though such tire has lost all of its inflation pressure. When the tires 24 and 25 come into operative contact with the ground the restrictor members function to carry a part of the load being carried by the wheel of which they are a part. If the tire 16 has lost all of its internal inflation pressure as, for example, due to a bullet piercing the casing and tube, then the restrictor rings provide a channel into which the tread portion of the tire 16 enters. As will be seen by reference to Fig. 3 this channel has ample depth and width to prevent the tire therein from becoming "chewed-up" or otherwise injured as would occur if the tire were run deflated without the protection of the restrictors 22 and 23. The inflation pressure causes the beads 18 and 19 of the tire to hold the portions 20 and 21 of the restrictor firmly against the flanges 13 and 11 respectively and accordingly when the inflation pressure is lost for any reason and the tire 16 is run in contact with the road the restrictors 22 and 23 will be shifted transversely back and forth on the rim 10 between the flanges 11 and 13. Such shifting will be resisted to some degree by the beads 18 and 19 and the bead lock 17. If the bead lock were omitted from the assembly the shifting of the restrictors would be considerable, yet such shifting is restrained to a considerable extent by the sides of the tire 16 pressing transversely outwardly against said restrictors. Nevertheless, it has been found that by employing bead lock means additional stability is imparted to the assembly, therefore, the use of such bead lock in combination with said restrictor members in an assembly as described is within the spirit and scope of the present invention.

When in service the restrictor members are carrying part of the load of the wheel of which they are a part, the peripheral edges of the restrictors become an auxiliary tire to the tire 16. As stated, hereinbefore, the restrictor's peripheral edges terminate in resilient tires 24 and 25. Actually these tires 24 and 25 when in operation carry a part of the load of said wheel and they are in the position of relatively widely spaced dual tires which provide additional stability to the mounting. The resilient tires 24 and 25 impart to the assembly the advantages of a rubber-tired vehicle over one with wheels with iron treads. These advantages are too well known to require enumerating; however, quieter running, better anti-skid qualities, faster speed and better cushioning may be mentioned. If found desirable the tread portions of the tires 24 and 25 may be provided with anti-skid elements in like manner as are conventional tires.

When a vehicle equipped with wheels constructed in accordance with this invention is removed from combat service and put into service in which flat tires are infrequent or where a tire may be changed with safety, the restrictor rings may conveniently be removed from the assembly. However, it is obvious that busses used to transport passengers could be equipped with wheels involving the present invention and thereby afford greater safety for the passengers from tire blowouts and flat tires.

While the invention has been described as having the restrictor members removably attached to the flanges of standard tire rims it is to be understood that the restrictor rings may be permanently attached to the flanges, as for example, by welding. It is to be understood that if the restrictor rings are permanently attached or made an integral part of the regular flange of a rim, or if a special rim were to be built with extended flanges to correspond to the flange and restrictor ring combination described above then only the advantages of removability of the restrictor rings would be lost and that the invention contemplates such modifications.

It is fully appreciated that the novel restrictor means herein disclosed has broad application to wheel constructions of different types and the invention is not to be limited except by the prior art and the scope of the appended claims.

I claim:

1. In combination with a wheel and tire assembly, bead locking means, a pair of annular restrictor rings supported upon the flanges of a straight side tire rim of said assembly and held in operative position thereon by pressure of the tire of said assembly against said restrictor rings, said rings extending radially and laterally outwardly diverging away from the tire side walls when the tire is inflated and then radially outwardly and in parallel relationship to the plane of the wheel and tire, the space between opposite, inner divergent and parallel sides of said rings being such as to allow lateral deflection of said tire when deflated or partly deflated such that in that condition the tire side walls will be entirely supported by said rings and the tread will be supported in a flattened position and in such manner as to support a substantial part of the load on said wheel.

2. In combination with a wheel, tire rim and pneumatic tire assembly of the class described, a pair of thin annular rings removably supported upon and between the flanges of said tire rim the sides of said rings extending radially and laterally outwardly from said tire rim flanges for a relatively short distance and then continuing in their extension in a direction substantially radial of the wheel for a distance and in a closely spaced relation with the sides of the pneumatic tire, said rings terminating in peripheral base portions which support resilient members in the form of cushion tires the outside diameter of said resilient members being less than the outside diameter of the said pneumatic tire, whereby auxiliary resilient rotatable load bearing means are provided, the relative proportions of rim, pneumatic tire and rings with said cushion tires being such that when the pneumatic tire is deflated, the pneumatic tire will have its side walls supported throughout their entire extent so that in compression, and as a strut, they support the pneumatic tire tread portion between the said restrictor rings in a manner to engage the road, and with the said restrictor ring flanges, carry their proportion of the load on said cushion tires.

3. In a vehicle wheel and tire assembly, means for restricting and limiting transverse bulging of the tire attached to a tire rim comprising a pair of thin annular members, the inner edge portions of which are formed to fit against and be supported by the inside flange surfaces of the tire rim, said members then extending radially and laterally outwardly diverging away from the tire side walls when the tire is inflated and then radially outwardly and in parallel relationship to the plane of the wheel and tire, the space between opposite, inner divergent and parallel sides of the annular members being such as to allow 25% to 30% lateral deflection of the deflated or partially deflated tire measured as the standing height above the flange of the rim, said deflation being such that in that condition the tire side walls will be entirely supported by said members and the tread will be supported in a flattened position and in such manner as to support a substantial part of the load on said wheel.

4. In a vehicle wheel and tire assembly, means for restricting and limiting transverse bulging of the tire attached to a tire rim comprising a pair of thin annular members, the inner edge portions of which are formed to fit against and be supported by the inside flange surfaces of the tire rim, said members then extending radially and laterally outwardly diverging away from the tire side walls when the tire is inflated and then radially outwardly and in parallel relationship to the plane of the wheel and tire, the space between opposite, inner divergent and parallel sides of the annular members being such as to allow lateral deflection of the deflated or partly deflated tire such that in that condition the tire side walls will be entirely supported by said members and the tread will be supported in a flattened position and in such manner as to support a substantial part of the load on said wheel.

5. In a pneumatic tire and wheel combination in which, when the tire is deflated, the tire structure serves to sustain at least 50% of the normal wheel load, a rim having side flanges of standardized curvature, a tire having straight side wall and bead constructions, and at either side of said rim, a restrictor ring retained and supported by the side flanges and of similar contour thereto at their tire bead engaging surfaces, said rings projecting radially and laterally outwardly away from the tire bead and side walls for a short distance and then radially outwardly substantially parallel to the plane of the wheel and tire and terminating in a road engaging flange, the relative proportions of rim, tire and rings being such that when the tire is deflated, the tire will have its side walls supported throughout their entire extent so that in compression, and as a strut, they support the tire tread portion between the restrictor ring flanges in a manner to engage the road, and with the said restrictor ring flanges, carry its proportion of the load.

WALTER E. LYON.